United States Patent [19]
Murray

[11] Patent Number: 5,153,570
[45] Date of Patent: Oct. 6, 1992

[54] MAGNIFICATION ASSEMBLY FOR DIGITIZER CURSOR

[75] Inventor: Wayne J. Murray, Bridgeport, Conn.

[73] Assignee: Summa Graphics Corporation, Seymour, Conn.

[21] Appl. No.: 436,336

[22] Filed: Nov. 13, 1989

Related U.S. Application Data

[63] Continuation-in-part of Ser. No. 199,674, May 27, 1988, Pat. No. 5,014,044.

[51] Int. Cl.[5] .............................. G09G 5/08
[52] U.S. Cl. .................. 340/710; 33/1 M; 178/18
[58] Field of Search .............. 340/706, 709, 710; 33/1 M, 18.1; 178/18, 19; 382/58, 59; 273/148 B

[56] References Cited

U.S. PATENT DOCUMENTS

| | | |
|---|---|---|
| 1,424,848 | 8/1922 | Paddison . |
| 1,806,422 | 5/1931 | Shaen . |
| 1,900,332 | 3/1933 | Coradi et al. . |
| 4,561,183 | 12/1985 | Shores . |
| 4,575,581 | 3/1986 | Langberg . |
| 4,639,547 | 1/1987 | Jacob et al. . |
| 4,693,554 | 9/1987 | Cordes . |
| 4,963,858 | 10/1990 | Chien ................................ 340/714 |
| 5,014,044 | 5/1991 | Murray . |

FOREIGN PATENT DOCUMENTS 17185 6/1898 Switzerland .

OTHER PUBLICATIONS

Advertisement of Summagraphics Corporation for Microgrid II Series, (Form No. 181, Rev. D, Mar. 1988).
Advertisement of Summagraphics Corporation for The Intelligent Digitizer (Form 380 10K).
J. Titus; "Digitizing Tablets offer choices of formats, operating modes, and pointers", Apr. 1986, pp. 69–72, 74 E.D.N. Electrical Design News, vol. 31, No. 8.
T. A. Noble; "Graphic-input devices for CAD/CAM", Feb. 1985, pp. 106–110, Machine Design, vol. 57, No. 4.

Primary Examiner—Jeffery A. Brier

[57] ABSTRACT

An assembly utilizable with a digitizer cursor for increasing the accuracy of position determinations made by the operator is disclosed. The assembly comprises in combination a magnifying lens and a connector for attaching the magnifying lens to the cursor in a region about the cross-hairs of the cursor. The connector includes a retainer that is attachable to the cursor and a pivot connected to the lens. The retainer is adapted to be affixed to a surface of the housing near the viewsight of the cursor. The hinge includes a stop adapted to hold the lens parallel to the plane of the cross-hairs. The hinge also includes a cam surface that provides friction between the hinge and the cursor so that the lens is held away from the region above the cross-hairs when the lens is swung away from the viewsight by the operator.

20 Claims, 5 Drawing Sheets

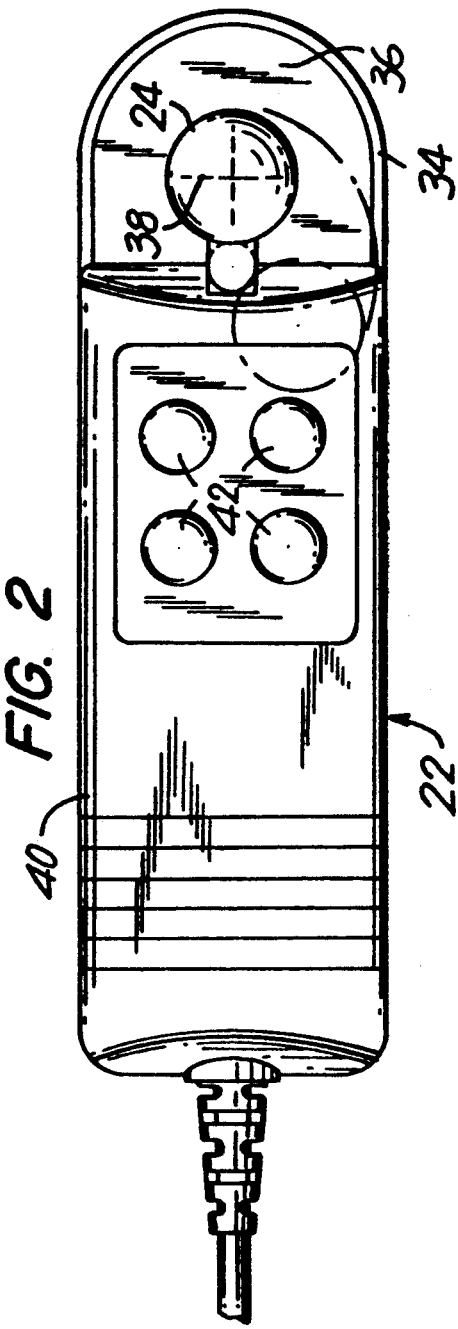
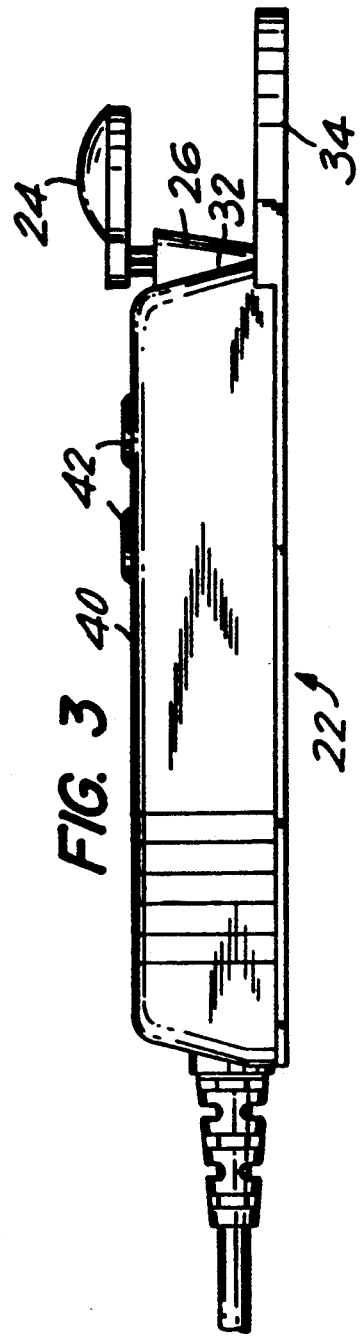
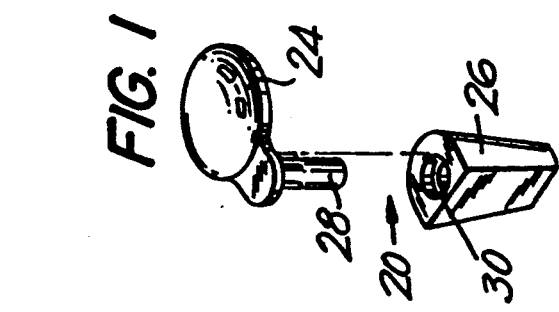

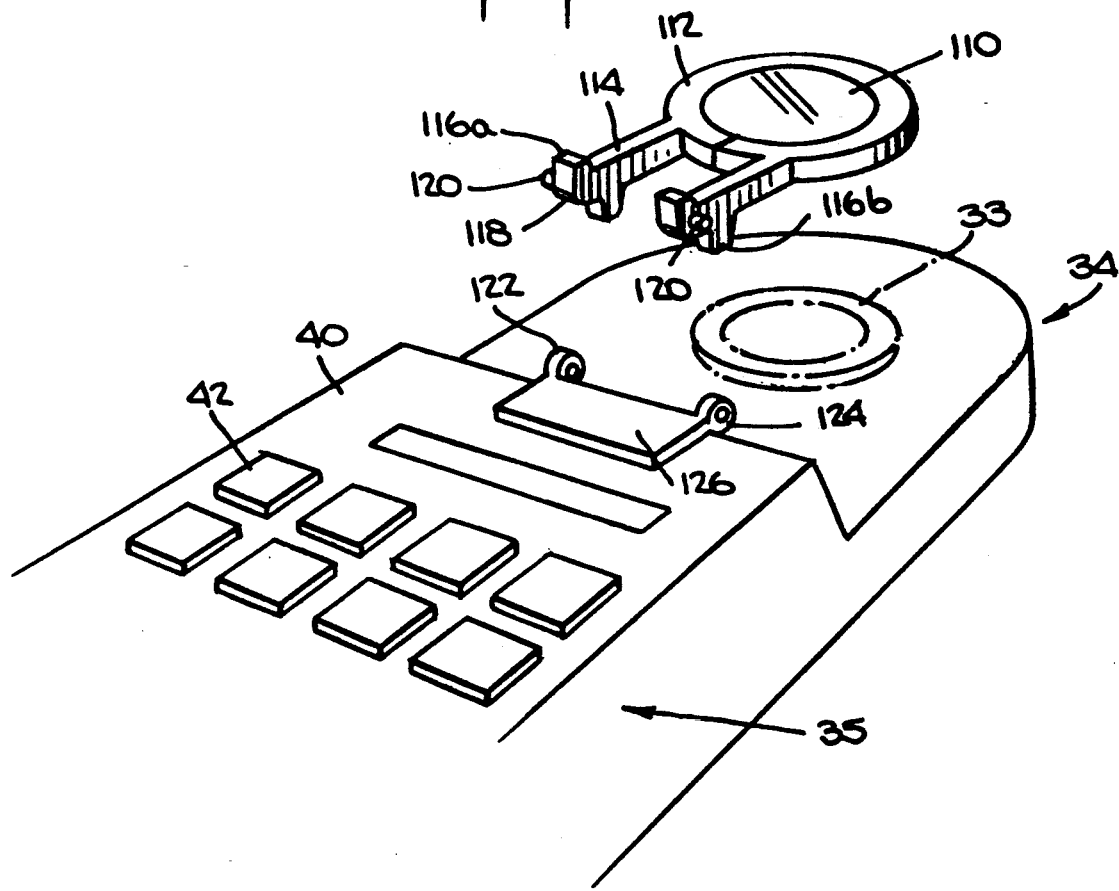

MAGNIFICATION ASSEMBLY FOR DIGITIZER CURSOR

This is a continuation-in-part of the commonly-assigned U.S. patent application Ser. No. 199,674 filed May 27, 1988, now U.S. Pat. No. 5,014,044.. This invention relates to an assembly utilizable with a digitizer cursor for increasing the accuracy of position determinations.

BACKGROUND OF THE INVENTION

Digitizers generally include a manually movable cursor and a digitizing surface or tablet. A sheet of paper or other surface bearing a two-dimensional graphic illustration or design to be converted into digital coordinates for use by a computer is laid on the digitizing surface. The cursor is then placed on the sheet of paper and manually moved from position to position to trace the illustration or design. At each desired position of the cursor, the operator customarily actuates a switch on the cursor to cause the coordinates of the position to be stored in a computer memory operatively connected to the cursor. To facilitate the alignment of the cursor with a feature of the illustration or design, the cursor is provided with cross-hairs which the operator aligns with the desired feature.

The position coordinates of a point on the digitizing surface are sensed through inductive or capacitive elements in the digitizing tablet and the cursor. Since the introduction of digitizers almost two decades ago, gradual improvements have increased the accuracy of the position sensing to a point now where accuracy limitations arise more from human error than from the crudeness of the digitizer design.

OBJECTS OF THE INVENTION

An object of the present invention is to provide an assembly for use with a digitizer cursor for increasing the accuracy of position determinations.

Another object of the present invention is to provide such an assembly which is easily mounted to a digitizer cursor and can be used on existing cursors.

Another, more particular, object of the present invention is to provide such an assembly which is easily moved to facilitate making coarse position determinations.

A further particular object of the present invention is to provide such an assembly which includes a magnification lens.

Yet another particular object of the present invention is to provide such an assembly with a magnification lens which is replaceable by lenses of different powers of magnification.

SUMMARY OF THE INVENTION

The present invention is directed to a digitizer cursor and an assembly utilizable with a digitizer cursor for increasing the accuracy of position determinations made on a surface, the cursor having a viewsight including cross-hairs for facilitating the positioning of the cursor at a desired point on the surface. The cross-hairs extend parallel to the surface. The viewsight limits the visibility of the area on the surface that is under the cursor.

An assembly in accordance with the present invention comprises in combination an optical element and a connector adapted to be attached to the cursor for mounting the optical element to the cursor so that the optical element can be swung into a position above the cross-hairs of the cursor. The connector includes a first member being attached to a surface of the housing of the cursor and the second member attached to the optical element.

In a particular embodiment, the connector includes a first member adapted to be affixed to the cursor and a second member attached to the lens, the first member and the second member being releasably connectable to one another. Preferably the first member takes the form of a retainer attachable to a surface of the housing of the cursor; and the other connector member includes a pivot adapted to be held by the retainer so that the lens may be swung down to a position over the cross-hairs.

In a particular embodiment of the present invention, the retainer is a capturing hinge and the pivot is provided by bosses. Preferably the bosses are held between two hooks.

In another particular embodiment of the present invention, the retainer is a clip.

Preferably the second member includes a camming surface. In a preferred embodiment the camming surface also has a stop at each end.

A magnifying assembly in accordance with the present invention is easily mounted to a digitizer cursor and can be used on existing cursors. In addition, the magnifying lens component of the assembly is easily neutralized, i.e., easily swung completely out of the viewing path to facilitate the making of coarse position determinations. The lens is retained in each of its two operative positions for operator convenience. The magnification lens of an assembly in accordance with the present invention is also easily interchangeable with lenses of different powers of magnification, should the circumstances of use warrant a different magnification power.

BRIEF DESCRIPTION OF THE DRAWING

FIG. 1 is a partially schematic perspective view of a magnifying assembly in accordance with the present invention for increasing the accuracy of position determinations by digitizers, showing in exploded view a magnifying lens insertable into a cradle.

FIG. 2 is a top view of a cursor with the magnifying assembly of FIG. 1 mounted thereto in an operative configuration.

FIG. 3 is a side elevational view of the cursor and magnifying assembly of FIG. 2.

FIG. 16 is a variant of the assembly shown in FIG. 14.

DETAILED DESCRIPTION

Figure 4:
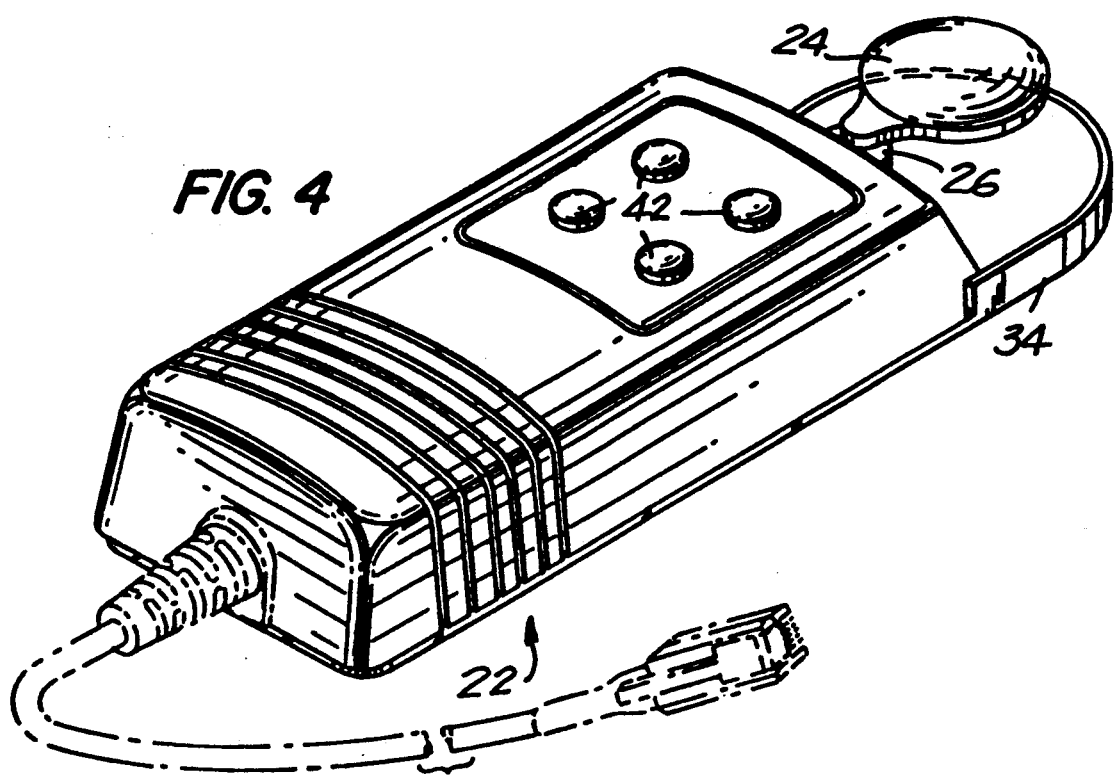
FIG. 4 is a perspective view, taken from the rear, of the magnifying assembly of FIGS. 2 and 3.

As illustrated in FIG. 1, an assembly 20 utilizable with a digitizer cursor 22 (FIGS. 2 and 3) for increasing the accuracy of position determinations comprises a magnifying lens 24 and a receptacle 26 for the lens 24. Integral with the magnifying lens 24 is a mounting pivot arm 28 which is insertable into a receiving recess 30 provided in receptacle 26.

As depicted in FIGS. 2 and 3, the receptacle 26 is a cradle that is attachable, e.g., via an adhesive, to a forward-facing surface 32 of cursor 22. The illustrated cursor 22 is part of a capacitive-type digitizer and is provided with a conductive ring 33 embedded in a plastic paddle 34 that is affixed to the underside of the housing 35 on the body of the cursor 22, and extends forward therefrom with respect to the forward-facing surface 32 of the cursor. The paddle 34 has a shielding layer 36 on its upper surface, at the exposed end thereof. In an operative orientation of magnifying lens 24, shown in solid lines in FIG. 2, the lens is disposed in vertical alignment with crosshairs 38 which may be molded or otherwise formed on the paddle centrally of the conductive ring. The magnifying lens enables an operator to position the cross-hairs in registration with a desired feature or position on a digitizing surface with an accuracy which is greater than possible with the unaided eye. As shown in broken lines in FIG. 2, magnifying lens 24 may be temporarily swung to a neutral or storage position to enable viewing of cross-hairs 38 with the unaided eye for the purpose of making coarse adjustments in the position of cursor 22.

Cursor 22 may be of a type utilizable with a capacitive digitizing tablet of the kind disclosed in U.S. Pat. No. 4,705,919 to Dhawan. It is of course apparent that the cursor may alternatively be of a type adapted for use with other types of digitizing tablets. As shown in FIGS. 1, 2 and 3, the housing 35 on the cursor 22 is provided on an upper surface 40 with a plurality of pushbuttons 42 whose functions are determined by programming and accordingly may be changed in accordance the particular application and in conformity with the desires of the operator.

Figure 5:
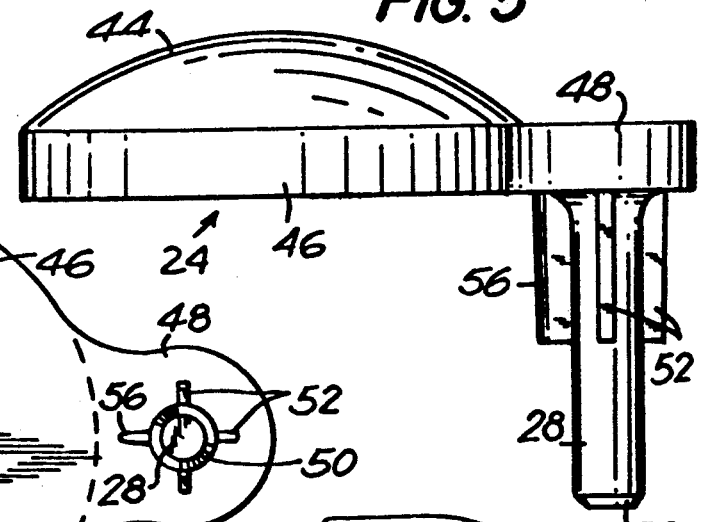
FIG. 5 is a side elevational view, on an enlarged scale, of the magnifying lens component illustrated in FIG. 1.
Figure 6:
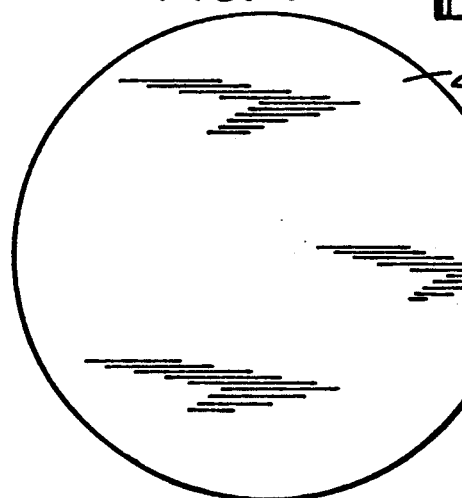
FIG. 6 is a bottom view, on an enlarged scale of the magnifying lens of FIGS. 1 and 5.

FIG. 5 shows magnifying lens 24 and mounting arm 28 as a unitary or integral molded component. Magnifying lens 24 takes the form of a solid bubble section or swelling 44 protruding from an upper side of a circular body portion 46. As illustrated in FIGS. 5 and 6, body portion 46 is provided with an extension 48 located in the plane of body portion 46. Mounting arm 28 takes the form of a cylindrical projection extending perpendicularly with respect to the plane of body portion 46 and connected to extension 48 on a lower side thereof, i.e., on a side of body portion 46 opposite lens bubble section 44. At a free end, mounting arm 28 is provided with a beveled surface 50 for facilitating the insertion of the magnifying lens into recess 30 in cradle 26.

Figure 7:
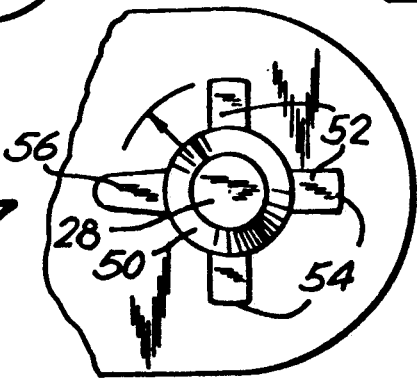
FIG. 7 is a partial bottom view, on a still larger scale, of a portion of the magnifying lens shown in FIG. 6.

As shown in FIGS. 5, 6 and 7, mounting arm 28 is provided with three circumferentially spaced longitudinally extending ribs 52 each having a cylindrical outer surface 54. Ribs 52 are shorter than mounting arm 28 and are connected at an upper end to extension 48. A fourth rib 56 integral with mounting arm 28 has the same length as ribs 52 but a greater radial dimension or width.

Figure 8:
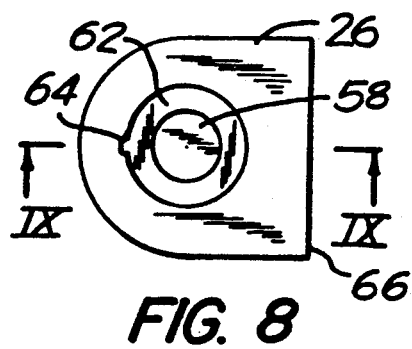
FIG. 8 is a top view of the cradle component of FIG. 1.
Figure 9:
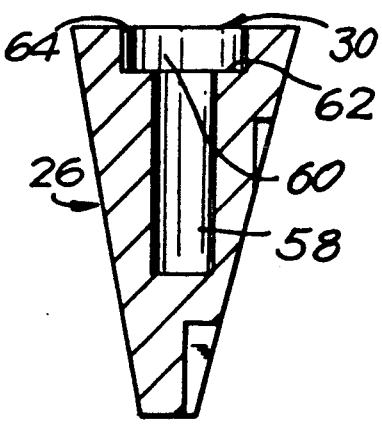
FIG. 9 is a cross-sectional view, taken along line IX—IX in FIG. 8.
Figure 10:
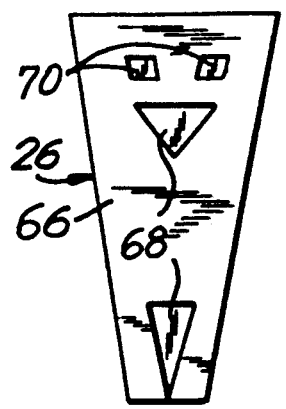
FIG. 10 is an elevational view of the cradle of FIGS. 1, 8 and 9, taken from the right-hand side in FIGS. 8 and 9.

FIGS. 8-10 illustrate cradle 26 in detail. Recess 30 includes a cylindrical lower or inner portion 58 and a cylindrical upper or outer portion 60. Outer recess portion 60 has a greater diameter than inner recess portion 58, thereby defining a shoulder 62. Ribs 52 and 56 engage shoulder 62 in an assembled configuration of the magnifying assembly 20, shown in FIGS. 2 and 3.

Outer portion 60 of cradle recess 30 is provided with a notch 64 in which is seated the longitudinally extending free side of rib 56 in the operative configuration of the magnifying assembly, shown in solid lines in FIGS. 2. Rib 56 accordingly acts as a detent to lock magnifying lens 24 in position over cross-hairs 38. Magnifying lens 24 may be rotated by exerting sufficient torque on the lens component to snap rib 56 out of notch 64. The lens component is then swung to the storage position shown in broken lines in FIG. 2. During the rotation of magnifying lens 24, cylindrical outer surfaces 54 of ribs 52 slide along the cylindrical surface of outer recess portion 60. To facilitate the sliding of ribs 52 against the recess wall and to ensure a medium friction fit of the mounting arm to the cradle, particularly in neutral positions of the lens component, the radius of curvature of outer rib surfaces 54 is essentially equal to the radius of curvature of the cylindrical wall of outer recess portion 60.

As shown in FIGS. 1 and 8, cradle 26 has a rearwardly facing planar surface 66 to which adhesive is applied for attaching the cradle to forward facing surface 32 of cursor 22. As depicted in FIGS. 9 and 10, planar surface 66 may be provided with a multiplicity of triangular and rhomboid recesses 68 and 70 for maintaining a rearwardly disposed wall of cradle 26 at a substantially uniform thickness and to thereby relieve undesired stresses which may arise during fabrication of the cradle.

Both cradle 26 and magnifying lens 24 are manufactured by injection molding. Typically the lens has a magnification power of three. However, in accordance with the present invention, one lens component 24 may be replaced by another component having a greater magnification power, if warranted by the circumstances.

Figure 11:
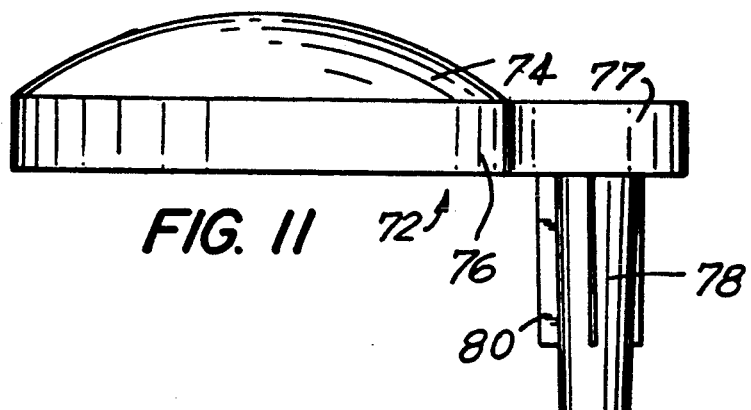
FIG. 11 is a side elevational view, on an enlarged scale, of another magnifying lens component in accordance with the present invention.

As shown in FIG. 11, a magnifying lens component 72 in accordance with another embodiment of the present invention includes a lens portion 74 integral with a disk-shaped body portion 76 in turn integral with an extension 77. Lens portion 72 is disposed on a side of body portion 74 opposite a cylindrical mounting arm 78 attached to extension 77 and projecting perpendicularly to the plane of body portion 74. A longitudinally oriented locating rib 80 is formed along mounting arm 78 and extends approximately halfway along the length thereof. The free end of mounting arm 78 is provided with an annular beveled surface 82.

Figure 13:
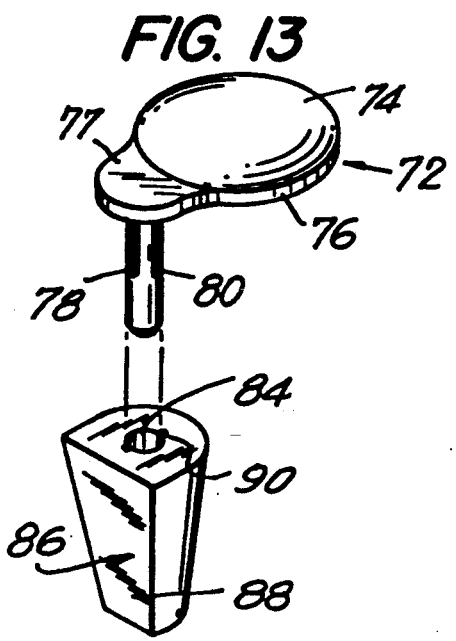
FIG. 13, is a perspective view of the magnifying lens of FIG. 12 in exploded relation to a corresponding cradle component.
Figure 12:
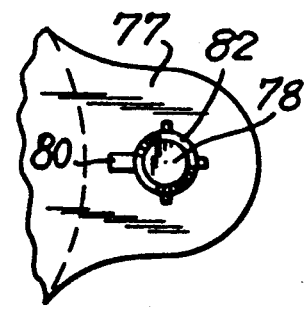
FIG. 12 is a partial bottom view, on an enlarged scale, of the magnifying lens shown in FIG. 12.

Mounting arm 78 is received in a cylindrical recess 84 in a cradle or receptacle 86 attachable by adhesive along a planar face 88 to a cursor in a region about the cross-hairs of the cursor. Locating rib 80 acts as a detent seatable in groove or notch 90 about recess 84. The magnifying lens of the embodiment of FIGS. 11-13 thus has four orthogonally disposed rest positions in which the lens component is locked to the cradle.

Figure 14:
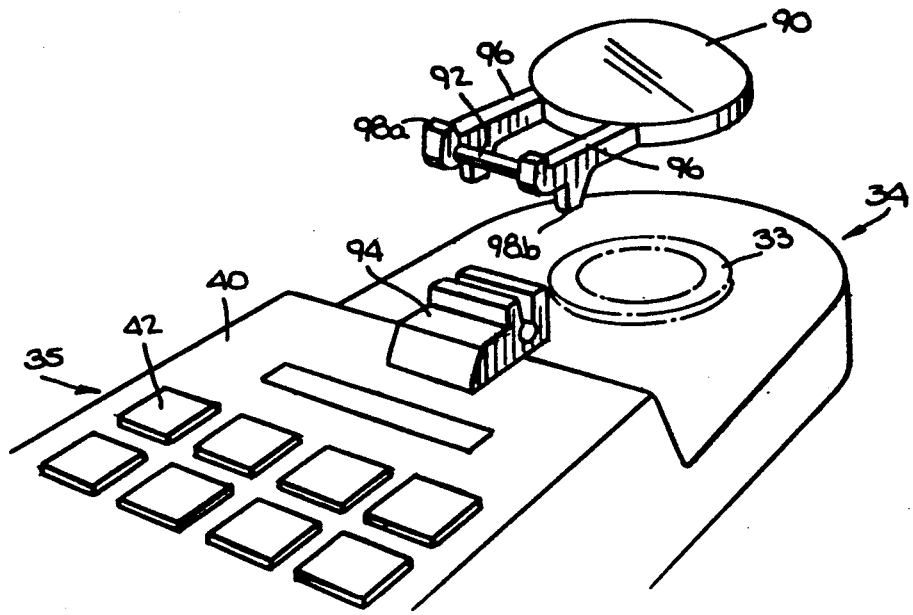
FIG. 14 is an exploded persppective view of another embodiment of the magnifying assembly in accordance with the present invention in an operative configuration.
Figure 15A:
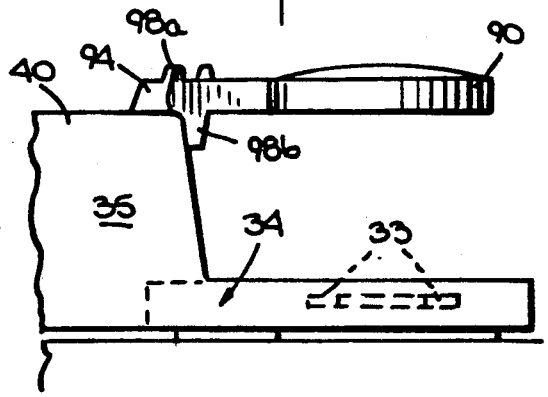
FIGS. 15a and 15b are two side views of the assembly shown in FIG. 14.
Figure 15B:
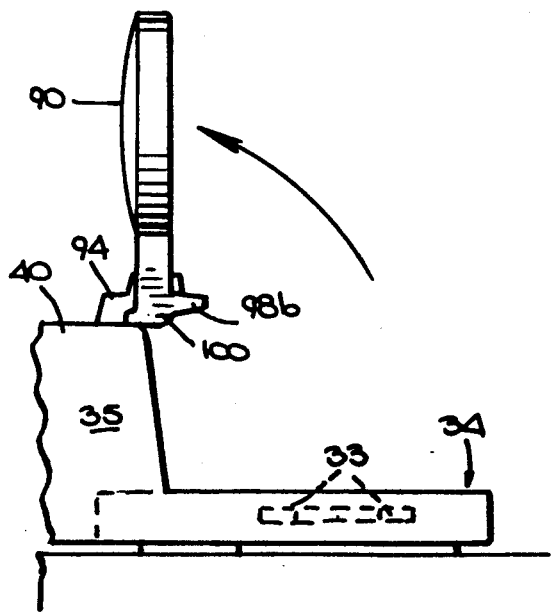

As shown in FIGS. 14 and 15, a plastic lens 90 is mounted for rotation in a vertical plane on a pivot bar 92. The pivot bar 92 is snap fit into a clip 94 that is solvent bonded or ultrasonically welded to the upper surface 40 of the housing 35. The lens 90 is molded as a unit with the pivot bar 92 and connected to it by two mounting arms 96. The arms 96 include an upper per stop 98a and a lower stop 98b, and a camming surface 100 between them. The camming surface 100 presses lightly against the upper surface 40 as the pivot bar 92 rotates, to resist movement of the lens 90 between the positions shown in FIGS. 15a and 15b, respectively, so that the lens is stable in either position and does not fall back into the operator's way while the operator is moving the cursor 22. This provides an unobstructed view of the viewsight 33 and the surface visible through the paddle 34 so that the cursor can be quickly repositioned over the digitizing surface.

Finally, the embodiment shown in FIG. 16 shows another lens 110 held in a split-ring rim 112. The mounting arms 114 have upper and lower stops 116a and b, respectively, and a camming surface 118, as discussed above. However, the arms 114 pivot on two bosses 120 that are adapted to be captured between two hooks 122, 124. The hooks 122, 124 are formed on a mounting plate 126 that is bonded to the upper surface 40 of the housing 35.

Although the invention has been described with reference to particular embodiments and applications, one of ordinary skill in the art, in light of this teaching, can generate variations and modifications thereof within the spirit and scope of the claimed invention. For example, other optical enhancements, such as using high speed optics that maximize the operator's field of view while magnifying the area near the cross-hairs are clearly conceivable by one skilled in the art. Accordingly, it is to be understood that the drawings and descriptions herein are profferred by way of example to facilitate comprehension of the invention and should not be construed to limit the scope thereof.

What is claimed is:

1. A digitizer cursor, said cursor comprising:
a housing
a viewsight attached to said housing, said viewsight including cross-hairs extending generally in a plane for facilitating the positioning of the cursor at a desired point on the surface;
an optical element; and
means for connecting said optical element to the cursor so that said optical element may be swung generally towards and away from said plane of said cross-hairs between a position registered with said cross-hairs and said viewsight and a position away from said viewsight, said connecting means including a first member attached to a surface of said housing near said viewsight and a second member attached to said lens, said first member and said second member being releasably connectable to one another so that said second member may be easily separated from said first member.

2. The cursor of claim 1, wherein said first member is affixed to the forward-facing surface of said housing.

3. The cursor of claim 1, wherein said first member is affixed to the upper surface of said housing.

4. The assembly of claim 1, wherein said second member includes two mounting arms and a pivot bar, said mounting arms being parallel to each other and projecting in the same direction.

5. The assembly of claim 4, wherein said first member is provided with a clip adapted for releasably receiving said pivot bar.

6. The assembly of claim 1, wherein said first member is a capturing hinge.

7. The assembly of claim 6 wherein said second member includes two bosses and said first member includes two hooks adapted to capture said hooks.

8. The assembly of claim 1, further comprising a stop on said second member, said stop being adapted to hold said second member in a position such that said optical element is disposed in a predetermined position with respect to said cursor.

9. The assembly of claim 1, further comprising a camming surface on said second member, said second member cooperating with said first member and the cursor so that said cam surface holds said second member in a position such that said optical element is disposed in a predetermined position with respect to said cursor.

10. The assembly of claim 1, wherein said optical element is a magnifying lens.

11. The assembly of claim 1, wherein said means for connecting includes means for releasably locking said optical element in said positions.

12. A digitizer cursor for use on a surface, said cursor comprising:
a viewsight including cross-hairs extending generally in a plane for facilitating the positioning of the cursor at a desired point on the surface;
an optical element; and
means for connecting said optical element to said cursor so that said optical element may be swung between a plane extending generally parallel to said plane of said cross-hairs with said optical elements registered with said cross-hairs and said viewsight and a plane extending at an angle to said plane of said crosshairs with said optical element away from said viewsight so as to expose said viewsight, said connecting means including a first member adapted to be attached to said cursor and a second member attached to said optical element, said first member and said second member being releasably connectable to one another so that said second member may be easily separated from said first member.

13. The cursor of claim 12, wherein said second member includes two mounting arms and a pivot bar, said mounting arms being parallel to each other and projecting in the same direction.

14. The cursor of claim 13, wherein said first member is provided with a clip adapted for releasably receiving said pivot bar.

15. The cursor of claim 12, wherein said first member is a capturing hinge.

16. The cursor of claim 15, wherein said second member includes two bosses and said first member includes two hooks adapted to capture said bosses.

17. The cursor of claim 12, further comprising a stop on said second member, said stop being adapted to hold said second member in a position such that said optical element is disposed in a predetermined position with respect to said cursor.

18. The cursor of claim 12, further comprising a camming surface on said second member, said second member cooperating with said first member and the cursor so that said camming surface holds said second member in a position such that said optical element extends in said plane away from said viewsight.

19. The cursor of claim 12, wherein said optical element is a magnifying lens.

20. The assembly of claim 12, wherein said means for connecting includes means for releasably locking said optical element in said positions.

* * * * *